United States Patent [19]

Cuneo et al.

[11] Patent Number: 5,340,247
[45] Date of Patent: Aug. 23, 1994

[54] WORKCENTRE AND SUPPORTS

[75] Inventors: Giusepse Cuneo, Calolzio Corte; Sergio Bonacina, Galbiate, both of Italy

[73] Assignee: Black & Decker Inc., Newark, Del.

[21] Appl. No.: 136,886

[22] Filed: Oct. 18, 1993

Related U.S. Application Data

[63] Continuation of Ser. No. 26,349, Mar. 4, 1993.

[30] Foreign Application Priority Data

Mar. 5, 1992 [GB] United Kingdom ............... 9204769

[51] Int. Cl.$^5$ ............ B23B 3/00; B27B 1/00; B23Q 1/00
[52] U.S. Cl. ................ 409/202; 29/26 A; 74/89.15; 144/2 R; 144/134 R; 144/134 A; 144/356; 384/55; 384/58; 409/191; 409/235
[58] Field of Search ............ 384/55, 58; 74/89.15; 29/26 A, 27, 560; 409/190, 191, 202, 235, 236, 237, 238; 144/1 R, 2 R, 134 R, 134 A, 356

[56] References Cited

U.S. PATENT DOCUMENTS

| | | | |
|---|---|---|---|
| 2,483,535 | 10/1949 | Gallimore | 409/202 |
| 2,917,977 | 12/1959 | Swanson et al. | 409/202 |
| 2,997,346 | 8/1961 | Beninger et al. | 384/55 |
| 3,523,485 | 8/1970 | Klein | 409/202 |
| 4,102,245 | 7/1978 | Cousins | 144/134 R |
| 4,112,906 | 9/1978 | Strange et al. | 144/356 |
| 4,354,798 | 10/1982 | De Muynak | 144/136 R |
| 4,375,195 | 3/1983 | Tsuboi | 384/58 |
| 4,382,728 | 5/1983 | Anderson et al. | 409/191 |
| 4,466,770 | 8/1984 | Peroutky | 74/89.15 |
| 4,656,881 | 4/1987 | Goedecke et al. | 384/55 |
| 4,945,958 | 8/1990 | Shoda | 29/26 A |

FOREIGN PATENT DOCUMENTS

| | | |
|---|---|---|
| 897995 | 1/1984 | Belgium . |
| 0111565 | 6/1984 | European Pat. Off. . |
| 3336496 | 4/1985 | Fed. Rep. of Germany . |
| 8511473 | 8/1985 | Fed. Rep. of Germany . |
| 3629368 | 3/1988 | Fed. Rep. of Germany . |
| 1432740 | 6/1966 | France . |

*Primary Examiner*—W. Donald Bray
*Attorney, Agent, or Firm*—John D. Del Ponti; Dennis A. Dearing; Charles E. Yocum

[57] ABSTRACT

A workcenter (10) comprises its supports (14a,b,c) which each carry a carriage (24a,b,c) movable along the supports by motors (30a,b,c) under central computer control (41). Each support is an aluminium extruded U-shaped section having four tracks (28) comprising steel strips (27) in slots (29). The carriage is likewise extruded having undercut slots (83) receiving the heads (92) of axles (90) which have eccentric stubs (96) on which bearing wheels (26) are journalled. Four wheels are so-mounted at each end of the carriage. The workcenter is adaptable between different modes of operation; overhang or cantilever by virtue of the profile of the supports.

13 Claims, 7 Drawing Sheets

WORKCENTRE AND SUPPORTS

This application is a continuation of application Ser. No. 08/026,349, filed Mar. 4, 1993.

BACKGROUND AND SUMMARY OF THE INVENTION

This invention relates to a workcentre and to supports therefor, and particularly to a wood-machining workcentre of the type comprising a frame mounting a router or like tool for movement in the frame in two, or more likely three orthogonal directions. Such movement may be under the control of a computer performing individual movements according to direct operator control or a sequence of movements according to pre-programmed control.

In any event, the frame comprises two (or three) linear elements each mounting a carriage slidable along the element under the action of a motor. In frames moving in three orthogonal directions, the first element is fixed with respect to a worktable; the second element is mounted perpendicularly with respect to the first element and is mounted on the carriage of the first element; and the third element is mounted perpendicularly to both the first and second elements on the carriage of the second element. A tool is mounted on the carriage of the third element.

The carriage is driven along the element by a motor and several options are available for connecting the motor to the carriage. For example, the motor may be mounted on the carriage and acting against the element. Alternatively, the motor may be mounted on the element and drive the carriage through a worm-drive screw or by a belt and pulleys on the carriage.

In any event, it is an object of the present invention to provide a workcentre whose construction is adaptable according to requirements.

In accordance with the present invention there is provided a workcentre comprising first, second and third linear elements each arranged in substantially orthoganol first, second and third directions respectively, the first element being fixed with respect to a worktable lying in a plane parallel to said first and second directions, the second element being fixed to a carriage of the first element, one end of said second element being supported against movement in said third direction, said third element being mounted on a carriage of said second element and a carriage of said third element carrying a tool for performing cutting operations on a workpiece supported on said worktable, said second element being adapted to be mounted on its carriage in one of two positions, in a first of which said carriage of the second element is between said one end and said carriage of the first element and in the second of which positions said carriage of the first element is between said one end and said carriage of the second element.

Said second element being supported against movement only in said third direction may include an end plate fixed at the end of the second element, said plate carrying bearing means, a rail being aligned parallel to said first element having tracks along which said bearing means are adapted to roll. Preferably said bearing means comprises three axles on each of which is journalled a bearing wheel.

Preferably all the axles are parallel and in the plane of said first and second directions, two tracks facing one another and lying parallel said plane, two end ones of said bearing wheels being adapted to roll on one track while the other central wheel is adapted to roll on the other track, each axle comprising an eccentric stub on which said wheel is mounted for adjustment in said third direction.

Alternatively said bearing means may comprise a single bearing wheel having a concave surface and said rail comprises a bar of corresponding mating shape with said concave surface.

Thus the workcentre according to the present invention is adaptable between two configurations. In a first configuration it is in overhang mode and the worktable is disposed between said first element and the rail so that workpieces no wider than the gap between the first element and rail can be machined by the workcentre. On the other hand, the second element is securely located at each end and therefore very accurate machining of the workpiece is possible.

In its second configuration, the workcentre is in its cantilever mode where the second element projects over the workpiece. The second element is mounted on the first element as close to said one end as possible, but not so close as to render the second element unstable given the length of it which is free. Nevertheless, there is now no limit to the width of objects capable of being machined by the workcentre and the overall possible width of machining of an object can be larger than in its overhang mode if the second element is mounted on the carriage of the first element nearer said one end of the second carriage than its other end.

Moreover, while a router is a most suitable tool for machining operations in a workcentre according to the present invention, at least in its overhang mode, an alternative arrangement in said cantilever mode is the installation of a circular saw on the carriage of said third element to render the workcentre a radial arm saw.

Said adaptability of the workcentre is achieved by said elements each comprising an extruded support of substantially U-shaped section, the carriage being received within said support and mounted on bearing wheels journalled to said carriage and running on four tracks formed in said support, four of said bearing wheels being mounted at or adjacent each end of the carriage on axles received in said carriage, the support having a profile which includes keyhole slots for reception of self-tapping screws from the ends of the support and undercut slots for reception of bolt heads or nuts whose associated shank extends out of said slot for attachment of elements to the sides of said support.

In this manner, the second element can be attached to the carriage of the first element anywhere along the length of the second element simply by sliding bolt heads or nuts employed to secure the carriage and element together along said slots to the required position.

Thus it is preferred that said profile has a pair of said undercut slots opening in a direction opposite to the opening of the slot forming said U-shape.

Preferably two of said wheels at each end of the carriage are radially adjustable to take up free play between said carriage and support in a plane perpendicular to a carriage centre line, which line is parallel to said tracks.

Preferably said axles are substantially radial with respect to said centre line.

Preferably a plane passes through said line and divides said axles into pairs disposed symmetrically on either side of said plane.

Preferably said plane passes through the middle of a slot formed by said U-shaped section of the support and the respective tracks of each pair of axles are adjacent each other.

Preferably each track comprises a steel strip received in an undercut channel formed in said support.

Preferably the axles are adjustable by an eccentric stub section of the axle mounted in the wheel or support, said axle being rotatable in the support to adjust the angular position of said eccentric stub. Preferably only the axles remote from said slot are adjustable through holes formed in said support along its length for insertion of a tool to turn each axle.

Preferably the carriage is an extruded section having a main body mounting said axles and being received within said support and an integral carriage plate for attachment thereto of a second linear element or a tool.

An intermediate plate may be interposed between said second linear element and the carriage plate, said intermediate plate mounting further bearing wheels bearing against the outside of said U-shaped section support.

Preferably said axles each comprise a head, a haft concentric with said head and a stub on the end of said haft which is eccentric with respect thereto, said stub being threaded at its end to receive a nut and a bearing wheel being adapted for reception on said stub, the carriage comprising undercut channels into which said head is adapted to be received, said nut not only clamping said bearing wheel in position but also locking said axle in position.

The workcentre preferably further comprises a computer to control movement of said linear elements, each of which is driven by a motor.

Said second element may be mounted in the second of its two positions and said tool may be a circular saw. In this event, the motor of said third element may be arranged to rotate said saw about an axis parallel said third direction and said computer controls the angular position of the saw so that a blade of the saw is aligned withy the direction of movement of the saw, as controlled by the computer, in the plane of said first and second directions.

This enables mitre cuts to be effected by the saw. Moreover, means can be provided to ensure that movement is said first and second directions only occurs if the blade is first orientated in the direction of the resultant movement in the plane of said first and second direction.

The invention is further described hereinafter, by way of example only, with reference to the accompanying drawings.

BRIEF DESCRIPTION OF THE DRAWINGS

FIGS. 4a and b are sections through the support and carriage extrusions respectively;

FIGS. 5a and b are side and end views of a bearing wheel axle;

FIGS. 8a and b are side views of two different embodiments of construction according to the present invention;

DETAILED DESCRIPTION OF THE PREFERRED EMBODIMENTS

Figure 1:
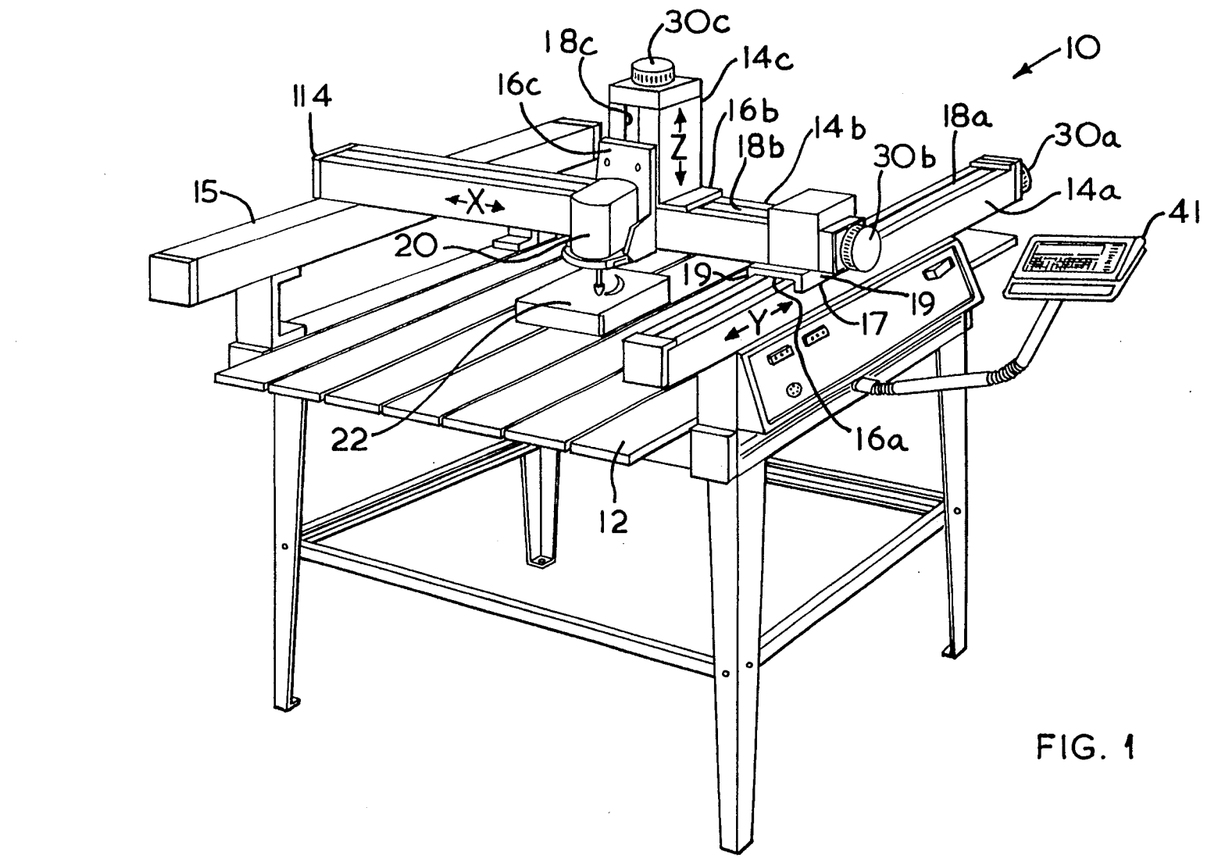
FIG. 1 is a perspective view of a workcentre in accordance with the present invention.

In FIG. 1 of the drawings, a workcentre 10 comprises three box section type girder tracks or supports 14a, b and c arranged in three orthogonal directions Y, X, Z respectively. Each support mounts a carriage (not shown), and plate parts 16a, b, c of which project through top slots 18a, b, c of each support respectively. Plate 16a mounts one end of the support 14b whose other end is supported on a rail 15. The plate part 16b supports the track 14c and the plate part 16c carries a tool 20 for carrying out cutting operations on a workpiece 22 mounted on a table 12 of the workcentre 10.

Figure 2:
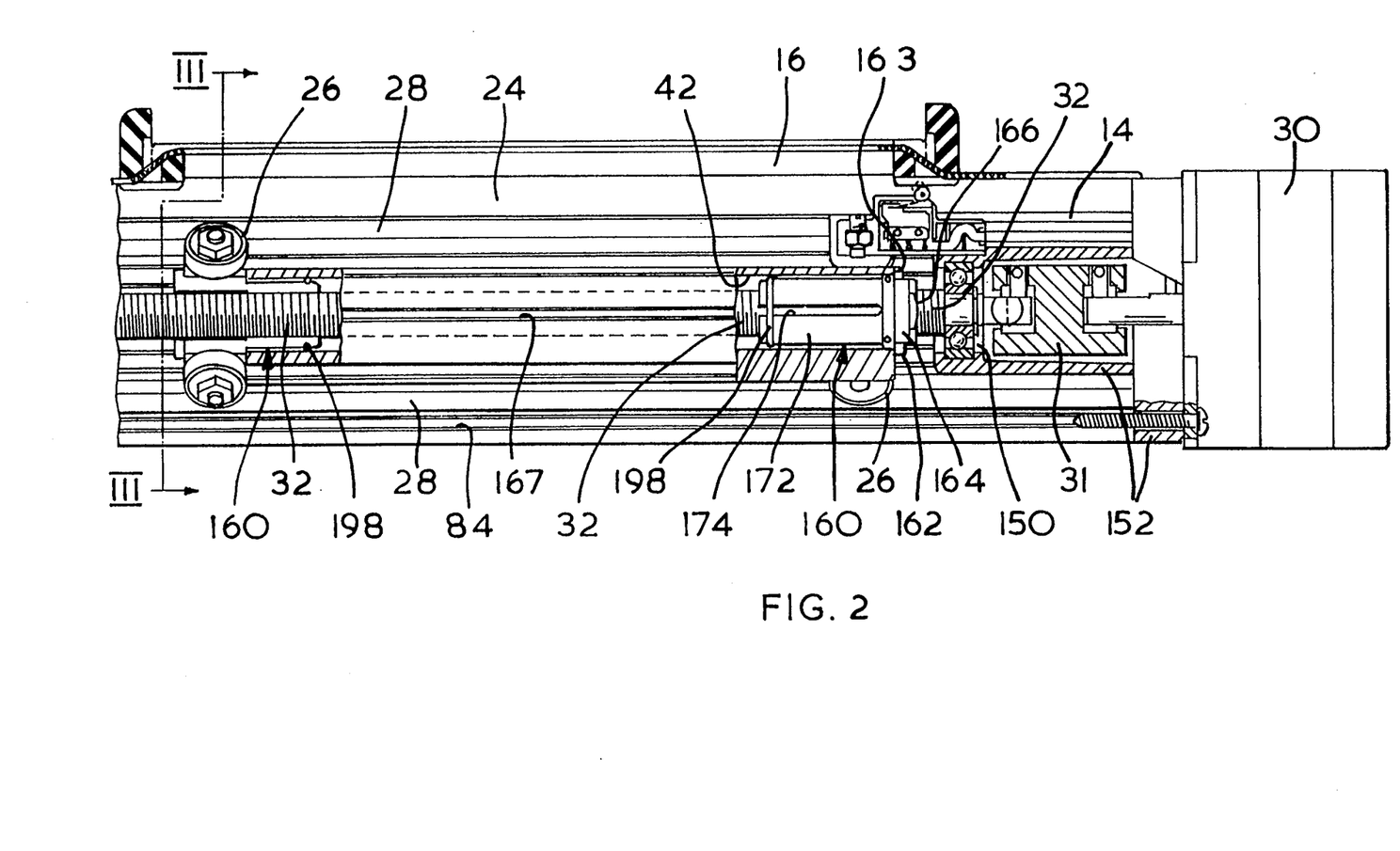
FIG. 2 is a side view in different sections of a support and carriage.
Figure 3:
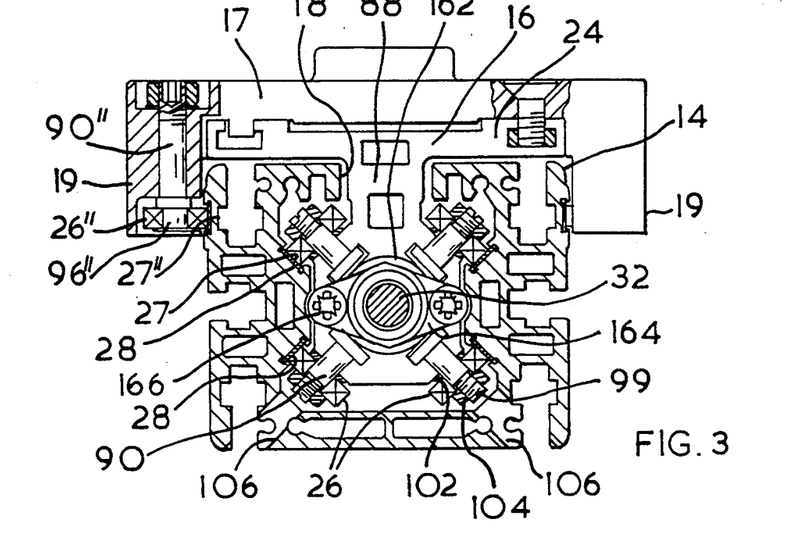
FIG. 3 is a section on the line III—III in FIG. 2.

Turning to FIGS. 2 and 3, each support 14 mounts a carriage 24 which has wheels 26 arranged in the form of a cross and adapted to roll along tracks 28 formed in the support 14.

The carriage 24 is driven along the support 14 by a motor 30 which, through a coupling 31 rotates a worm drive screw 32. One end of the screw 32 is supported by a bearing 150 mounted in an end plate 152 and to which the motor 30 is secured. The screw 32 passes through a bore 42 of the carriage 24 and is supported at its other end by a cup 33 (see FIG. 6).

Figures 4A, 4B, 5A, 5B:
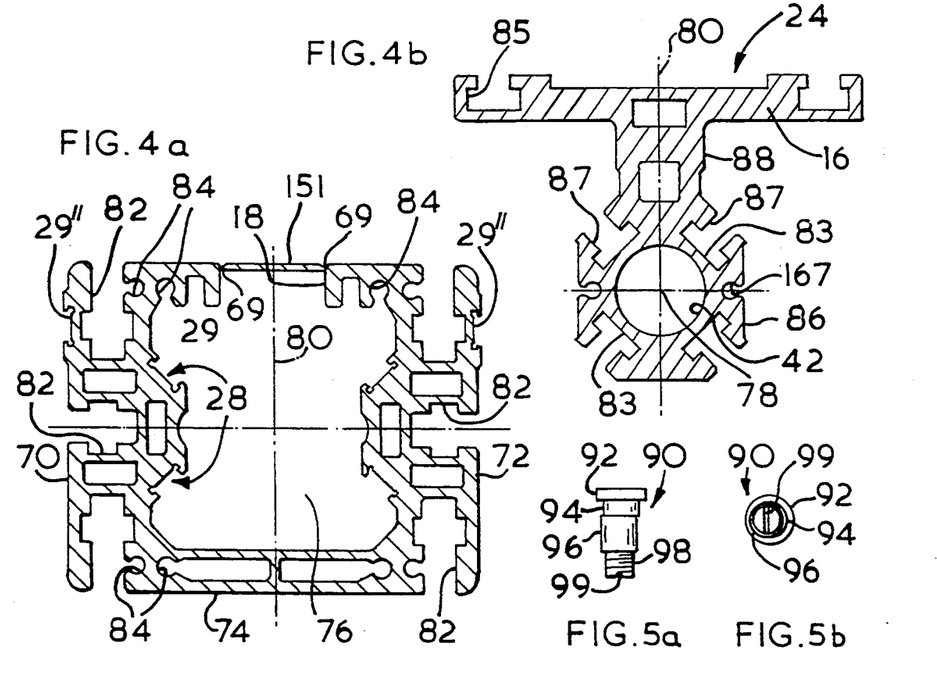

Two sleeves 160 are fitted in each end of the bore 42 and are clamped in place by end caps 164 secured by screws 166 screwed into keyhole slots 167 formed on either side of carriage 24 (see FIG. 4b). The sleeves 160 are threaded internally and engage the threads of the screw 32. The precise construction and arrangement of the sleeves 160 has no bearing on the present invention. They are described in further detail in our copending application filed simultaneously herewith. It need only be said here that rotation of the screw 32 in the sleeves 160 drives the carriage along the support 14.

Returning to FIG. 1, each support 14a, b, c has its own motor 30a, b, c driving its own screw and thence its own carriage. Thus the tool 20 is moveable in three dimensions to affect various cutting operations on the workpiece 22. The motors 30 are controlled by a console 41 and by means of which an operator can effect specific movements under direct control or a sequence of movement, under programmed control. However, such control means and methods are not the subject of the present invention.

Referring to FIGS. 4a and b, the supports 14 and carriages 24 are each extruded sections of aluminium. FIG. 4a is the profile of the support 14 which has a roof 151 serving to maintain the precise shape of the section while it cools and hardens after extrusion. In use, the roof 151 is punched out along lines 69 and is discarded. Its removal forms the required open slot 18. The support 14 has sides 70, 72 and bottom 74 defining interior space 76 having a centre line 78 and central plane 80 passing through the middle of slot 18. Along each side 70, 72 there is formed undercut slots 82 and keyhole slots 84 which have functions described in more detail below.

It is to be noted that the tracks 28 are formed from steel insert strips 27 retained in undercut channels 29 formed in the supports 14. These strips reduce the wear caused by rolling of the wheels 26 back and forth along the tracks 28.

The carriage 24 in FIG. 4b comprises a main body 86 and an integral carrier plate 16. The main body 86 is adapted to fit in the space 76 while a neck 88 between the main body and carrier plate 16 passes through the slot 18. Both the main body and plate have undercut slots 83, 85 respectively and keyhole slots 167. The main body 86 has a centre line 78 around which the bore 42 is formed. The centre lines 78 of the carriage 24 and support 14 are coincident in use. The slots 83 of the main body 86 are adapted to receive the cylindrical heads 92 of axles 90. The axles have a haft 94 concentric with the head 92. The haft has a stub 96 which is eccentric to the haft and head. The stub has a threaded end 98 concentric therewith and provided with a screwdriver slot 99 at its end.

The head 92 fits in the slots 83, while the haft 94 is a close sliding fit in openings 87 of the slots 83. The depth of the haft 94 is sufficient to enable the eccentric stub 96 to clear the opening 87 so that the haft and head can freely rotate in the slot 83 about their axis. It is to be noted that the axes of the slots 83 are all radial with respect to the centre line 78 and symmetrically inclined with respect to the plane 80.

A washer 102 supports the inner race of each bearing wheel 26 which is a close sliding fit on the eccentric stub 96. A nut 104 is screwed on the threaded end 98 of the axle 90 and, when it is tightened, it clamps the inner race of the bearing 26, the washer 102 and the opening 87 of the slot 83 against the head 92 of the axle, so that the whole assembly becomes rigid. The position of the bearing wheel 26 with respect to the radial axis of its axle 90, and thus with respect to its track 28, depends on the angular position of the eccentric stub 96. This is adjusted by inserting and turning a screw driver in the slot 99.

Only two of the axles 90 (at each end of the carriage 24) require adjustment to take up any slack there might occur through manufacturing tolerances of the assembled parts. Moreover, any two axles would fulfill this requirement. However, because the plate 16 prevents straight access to the top two axles (in FIG. 3) and would have to be cut away to give access for a screwdriver, it is much more convenient to adjust only the two axles remote from the plate 16. For this purpose two holes 106 are formed in the support 14 through which a screwdriver can be inserted for adjustment of the axles 90 before final tightening of the nuts 104. Only two such holes 106 are required at a convenient point along the length of the supports 14. This enables the carriage to be positioned along the support so that, whichever end of the carriage that requires adjustment, the axles at that end are aligned with the holes 106. After appropriate adjustment to ensure that all wheels are firmly in engagement with their respective tracks and so that all torsional and radial free play with respect to the centre line 78 has been removed, the carriage is removed from the support for tightening of the nuts 104. In this respect, the axles of the upper wheels adjacent the plate 16 could be mounted on like axles 90 as described above enabling some preadjustment to those wheels before insertion of the carriage in its support.

Figure 6:
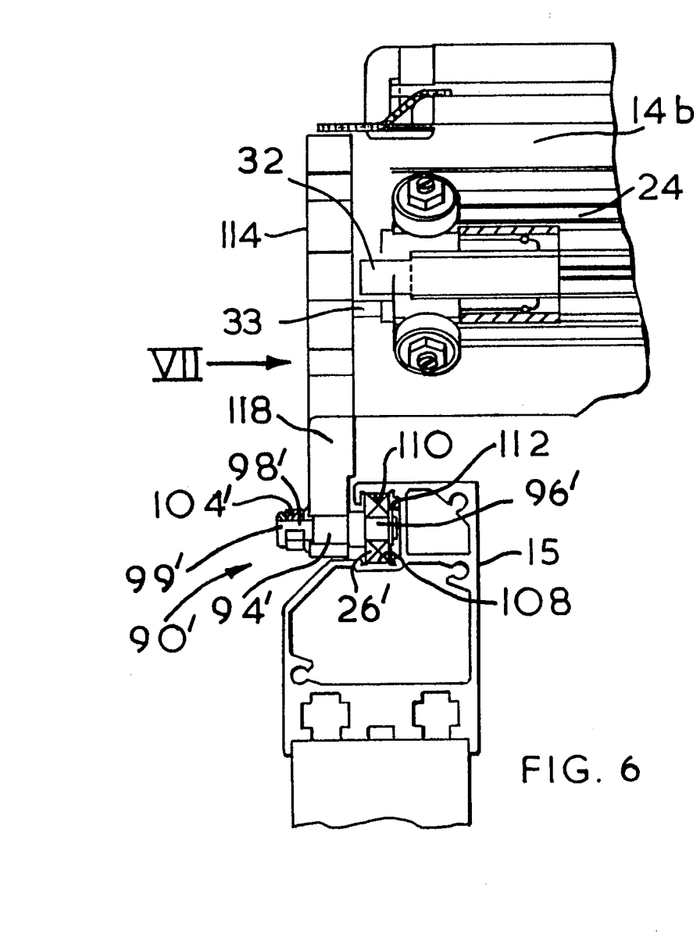
FIG. 6 is a side view, partly in section, of the end of one support.
Figure 7:
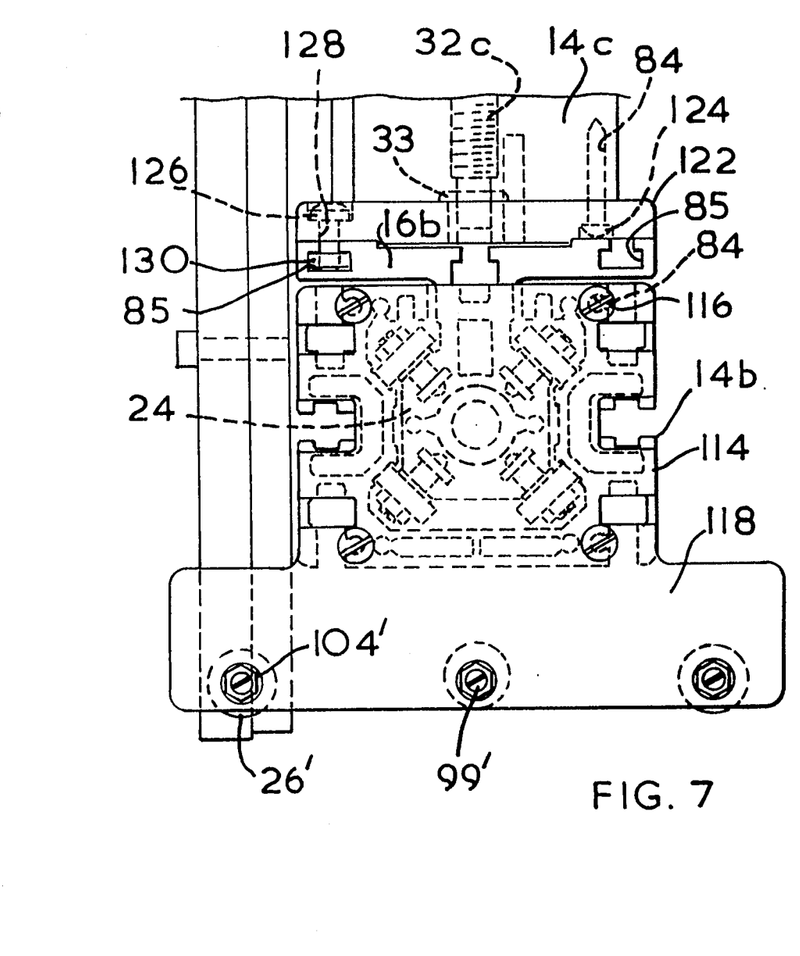
FIG. 7 is a view in the direction of the arrow VII in FIG. 6.

Referring again to FIG. 1, the support 14b is supported on plate 16a at one end and at its other end on a rail 15. FIGS. 6 and 7 show this arrangement in more detail.

The rail 15 is an extruded section having two horizontally arranged tracks 108, 110 facing one another in a channel 112 of the rail 15. Each track 108, 110 is formed by a steel reinforcing strip retained in undercut channels in the channel 112.

A steady plate 114 is attached to the end of the support 14b by screws 116 received in keyhole slots 84 of the support. (It is for this sort of purpose that the slots 84 are provided.)

The steady plate 114 has a downwardly depending leg 118 in which three axles 90' are received. Bearing wheels 26' are mounted on eccentric stubs 96' of the axles 90'. Rotation of the hafts 94' in the leg 118 adjusts the bearing wheels 26' radially. The axle has a threaded end 98' receiving a nut 104' and having a screwdriver slot 99'.

The two extreme bearing wheels 26' in the leg 118 are adapted by adjustment of their axles 90' to run on the lower track 108, while the central wheel runs on the upper track 110.

It is to be noted that the cup 33 supporting one end of the screw 32, is carried on the plate 114.

This end of the support 14b is thus securely held against any movement in the Z direction. It has complete freedom of movement along the tracks 108, 110 which are in the Y direction and is effectively held against movement in the X direction by the carriage 24a in the support 14a.

However, a problem can arise when the tool 20 is near the steady plate 114 end of the support 14b, and movement is required in the Y direction. In this circumstance, considerable torque can be placed on the carriage 24a in the support 14a about the Z axis. This is the only carriage on which such torque is applied. Consequently, here a support plate 17 is interposed between plate 16a and the support 14b (see also FIG. 3).

The plate 17 has two downwardly depending flanges 19 arranged on either side of the support 14a. In each of the flanges is mounted, one at either end (four in total), a bearing wheel 26''. These are mounted on an axle 90'' which, like the axles 90, 90', have eccentric stubs 96'' on which the wheels are mounted enabling radial adjustment thereof. On the sides 70, 72 of the supports 14, are formed undercut channels 29'' adapted to receive steel strips 27'' and against which the bearing wheels 26'' roll.

Not only does this arrangement of the plate 17 in itself counter the torque imposed on the carriage 24a, but also it prevents any spreading of the sides 70, 72 of the support 14a under the influence of that torque. In other words, the plate 17 serves to join the two arms 70, 72 of the U-shaped section support at the critical location where undesirable spreading forces can be applied to them.

Figures 8A, 8B:
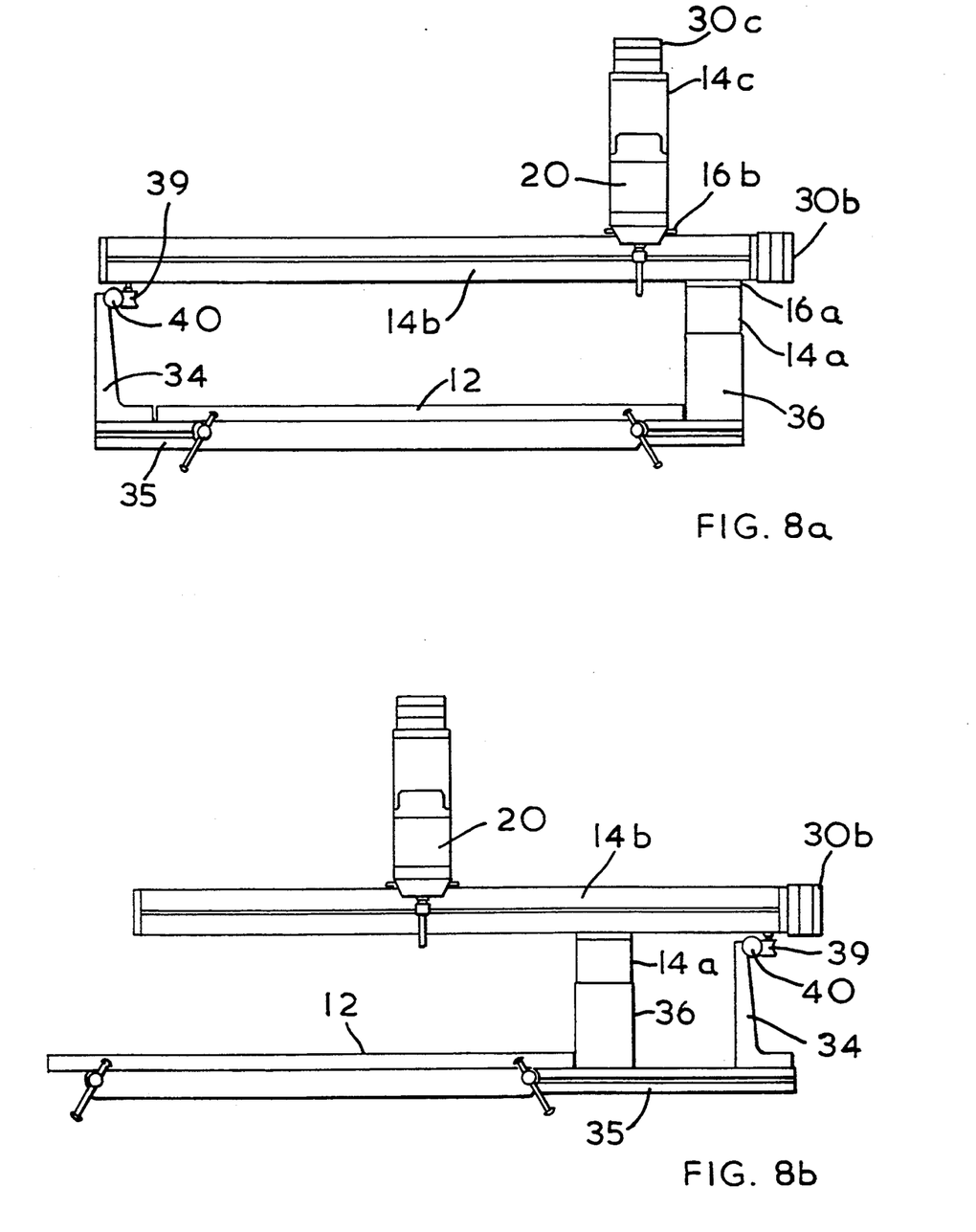
Figure 9A:
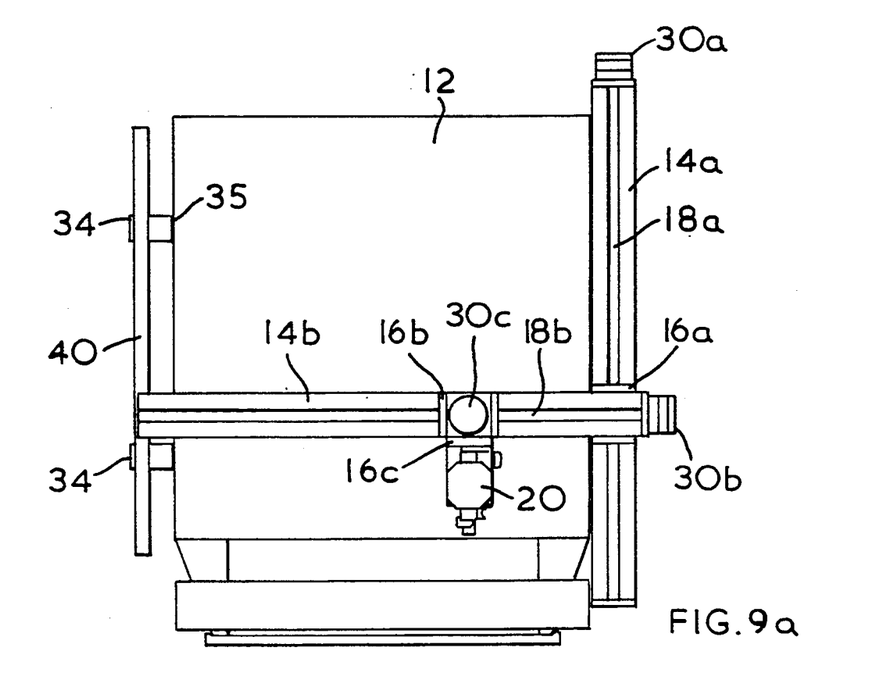
FIGS. 9a and b are plan views of the same two embodiments shown in FIGS. 8a and b; and, FIGS. 10a and b are side views of different arrangements of the embodiments of FIG. 8b.

FIG. 1 illustrates one arrangement of the workcentre according to the present invention. FIG. 8a and 9a are a side view and plan view respectively of such an arrangement, but here the rail 15 has been replaced by a bar 40. The bar 40 is connected to two legs 34 mounted on cross rails 35 on which the worktable 12 is adjustably received.

Instead of the plate 114, a concave roller 39 is attached to the end of the support 14b which bears against and rolls along the bar 40. The shape of the bar 40 and roller 39 are matched so that movement of that end of the support 14b in the Z direction is effectively inhibited.

However, an alternative arrangement is to provide two supports 14a parallel to each other, each with its own carriage 24 and intermediate plate 17, both supporting the second support 14b. The screws 32 in each parallel support may be driven by a single motor driving one screw directly and the other by a belt and pulley. Such an arrangement is very rigid.

In any event, an advantage with the present invention is that the use of extruded parts such as has been described herein and the use of the undercut slots 82 and keyhole slots 84 enable numerous alternative configuration of the workcentre to be achieved. The keyhole slots enable self tapping screws to be inserted and securely held, primarily to attach to the ends of the supports and carriages (viz. end caps 164 in the carriage 27; support plate 114 on support 14b etc.) The undercut slots 82, 83, 85 enable elements to be connected to the sides of the supports or to the carriage at any convenient position along their lengths (viz. axles 90 in slots 83). A further example of the use of these slots is shown in FIG. 7, in which the support 14c is connected to carriage 24b of support 14b. An end plate 122 is first screwed to support 14c by screws 124 received in keyhole slots 84 of the support 14c. The end plate 122 extends beyond the ends of support 14c and is the same length as the carriage 24b. Near the ends of both carriage plate 16b and end plate 122, bolts 126 are received in bores 128 near the corners of end plate 122. The bolts 126 are screwed into nuts 130 captivated in the slots 85 of the carriage 16b.

Figure 9B:
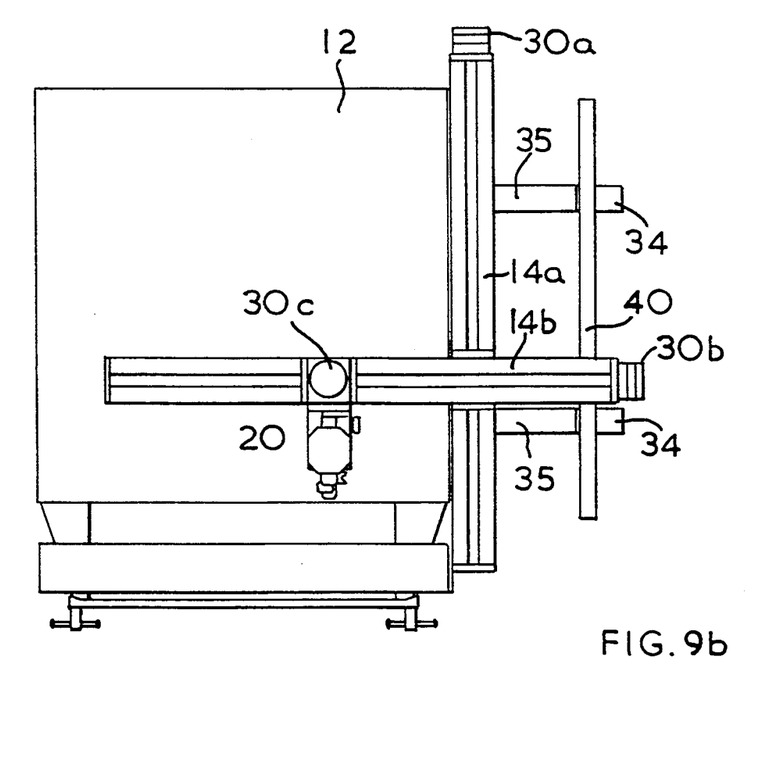

This modularity of the parts enables different arrangements to be constructed, and FIGS. 8b and 9b show one alternative. Here, the bar 40 and legs 34 have been moved to the other end of the cross rails 35; the table 12 has been moved over where the bar 40 is in FIG. 8a; and the support 14a, mounted on beam 36 on rails 35, has also been moved along. Support 14b has not however changed its position significantly with respect to the rails 35, so that it is now connected to the plate 16b intermediate its ends instead of adjacent the motor 30b. Indeed, the roller 39 is now moved adjacent the motor 30b so that the tool 20 is cantilevered over the worktable 12, instead of overhanging, as in FIG. 8a. This has the advantage that, even though some useful length of the support 14b is lost (i.e. that between the support 14a and bar 40), much wider objects can now be placed on the table 12 which is no longer limited by the gap in FIG. 8a between the legs 34 and beam 36. Moreover, with the possibility of working first on one side and then on the other side of objects placed on the worktable 12, the maximum width of workpiece than can be machined by the tool 20 is, in fact, increased over that possible with the embodiment of FIGS. 8a and 9a.

Figure 10A:
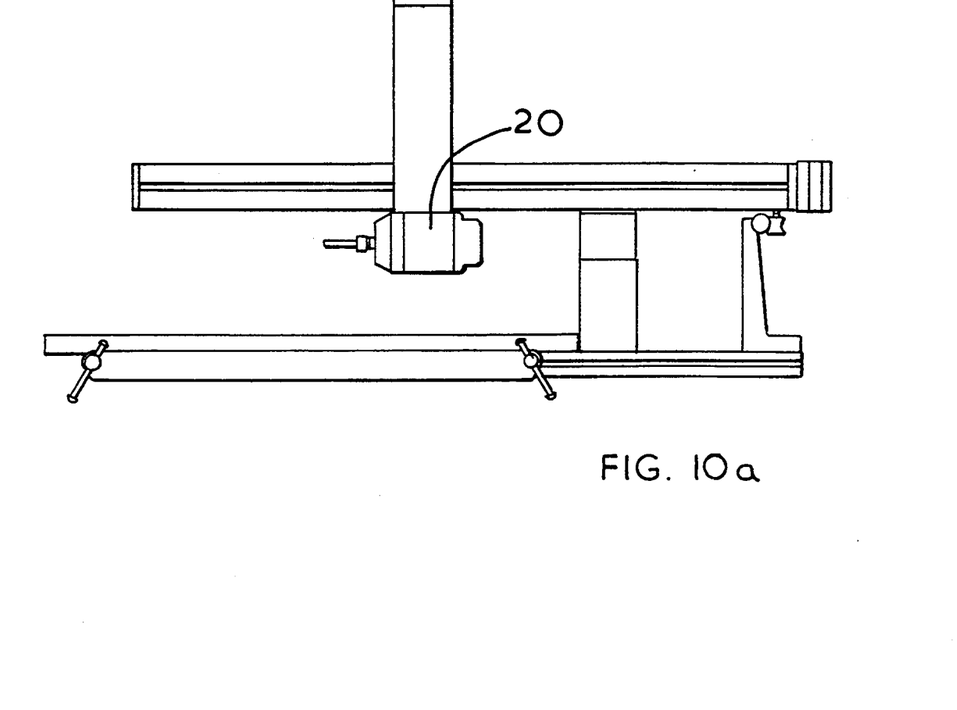

Moreover, with the arrangement shown in FIGS. 8b and 9b, different operating functions can be realised. In FIG. 10a, tool 20, which is a router, has been repositioned for working on vertical surfaces.

Figure 10B:
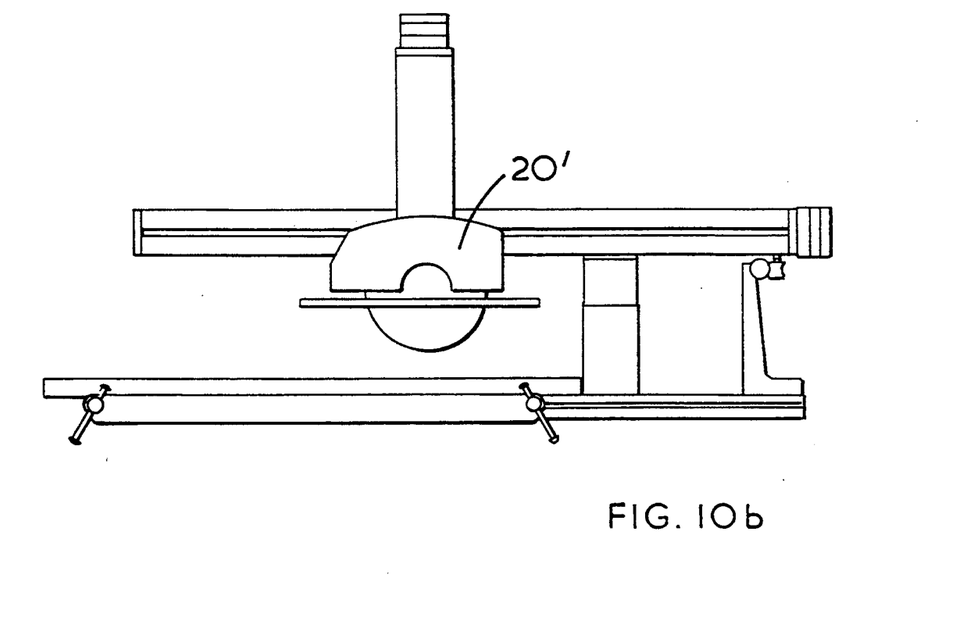

In FIG. 10b, the router has been replaced by a circular saw 20' for performance as a radial arm type saw. In this case, motor 30c can be arranged not only to raise and lower the saw 20', but also (or instead) to rotate the saw about the Z axis. This enables the saw to perform mitre cuts in workpieces when the blade of the saw is aligned with the resultant movement of the saw in the X,Y plain. Indeed, the computer 41 can be organised not only to drive the saw in the X,Y plan and ensure that the blade is oriented correctly with respect to the direction of movement in that plane, but also to inhibit such movement if the blade is not so aligned.

The above described embodiments, of course, are not to be construed as limiting the breadth of the present invention. Modifications, and other alternative constructions, will be apparent which are within the spirit and scope of the invention as defined in the appended claims.

What is claimed is:

1. A workcentre comprising first, second and third linear elements each arranged in substantially orthoganol first, second and third directions respectively, each element mounting a carriage for movement along said element, a worktable lying in a plane parallel to said first and second directions, the first element being fixed with respect to said worktable, the second element being fixed to the carriage of the first element, one end of said second element being supported against movement in said third direction, said third element being mounted on the carriage of said second element and the carriage of said third element carrying a tool for performing cutting operations on a workpiece supported on said worktable, said second element being adapted to be mounted on its carriage in one of two positions, in a first of which positions said carriage of the second element is between said one end and said carriage of the first element and in the second of which positions said carriage of the first element is between said one end and said carriage of the second element.

2. A worktable according to claim 1, wherein said second element being supported against movement in said third direction includes an end plate fixed at the end of the second element, said plate carrying bearing means, a rail being aligned parallel to said first element having tracks along which said bearing means are adapted to roll.

3. A workcentre according to claim 2, wherein said bearing means comprises three axles on each of which is journalled a bearing wheel.

4. A workcentre according to claim 3, wherein all said axles are parallel and in the plane of said first and second directions, wherein two tracks face one another and lie parallel said plane, and wherein two end ones of said bearing wheels are adapted to roll on one track while the other central wheel is adapted to roll on the other track, each axle comprising an eccentric stub on which said wheel is mounted for adjustment in said third direction.

5. A workcentre according to claim 2, wherein said bearing means comprises a single bearing wheel having a concave surface and said rail comprises a bar of corresponding mating shape with said concave surface.

6. A workcentre according to claim 1, wherein said elements each comprise an extruded support of substantially U-shaped section having four tracks formed therein, the carriage being received within said support and including bearing wheels journalled to said carriage and running on said tracks, four of said bearing wheels being mounted at or adjacent each end of the carriage on axles received in said carriage, the support having a profile which includes keyhole slots for reception of self-tapping screws from the ends of the support and undercut slots for reception of bolt heads or nuts whose associated shank extends out of said slot for attachment of elements to the sides of said support.

7. A workcentre according to claim 6, wherein said profile has a pair of said undercut slots opening in a direction opposite to the opening of the slot forming said U-shape.

8. A workcentre according to claim 6, wherein two of said wheels at each end of the carriage are radially adjustable to take up free play between said carriage and support in a plane perpendicular to a carriage centre line, which line is parallel to said tracks.

9. A workcentre according to claim 8, wherein each track comprises a steel strip received in an undercut channel formed in said support.

10. A workcentre according to claim 6, wherein an intermediate plate is interposed between said second element and the carriage of said first element, said intermediate plate mounting further bearing wheels against the outside of said U-shaped section support.

11. A workcentre according to claim 1 further comprising a computer to control movement of said linear elements, and a motor to drive each element.

12. A workcentre according to claim 11, wherein said second element is mounted in the second of its two positions and said tool is a circular saw.

13. A workcentre according to claim 12, wherein the motor of said third element is arranged to rotate said saw about an axis parallel said third direction and said computer controls the angular position of the saw so that a blade of the saw is aligned with the direction of movement of the saw as controlled by the computer, in the plane of said first and second directions.

* * * * *